Jan. 16, 1962    H. E. HALL, JR    3,016,960
RADIOACTIVITY GEOPHYSICAL EXPLORATION
Filed Aug. 13, 1957    2 Sheets-Sheet 2

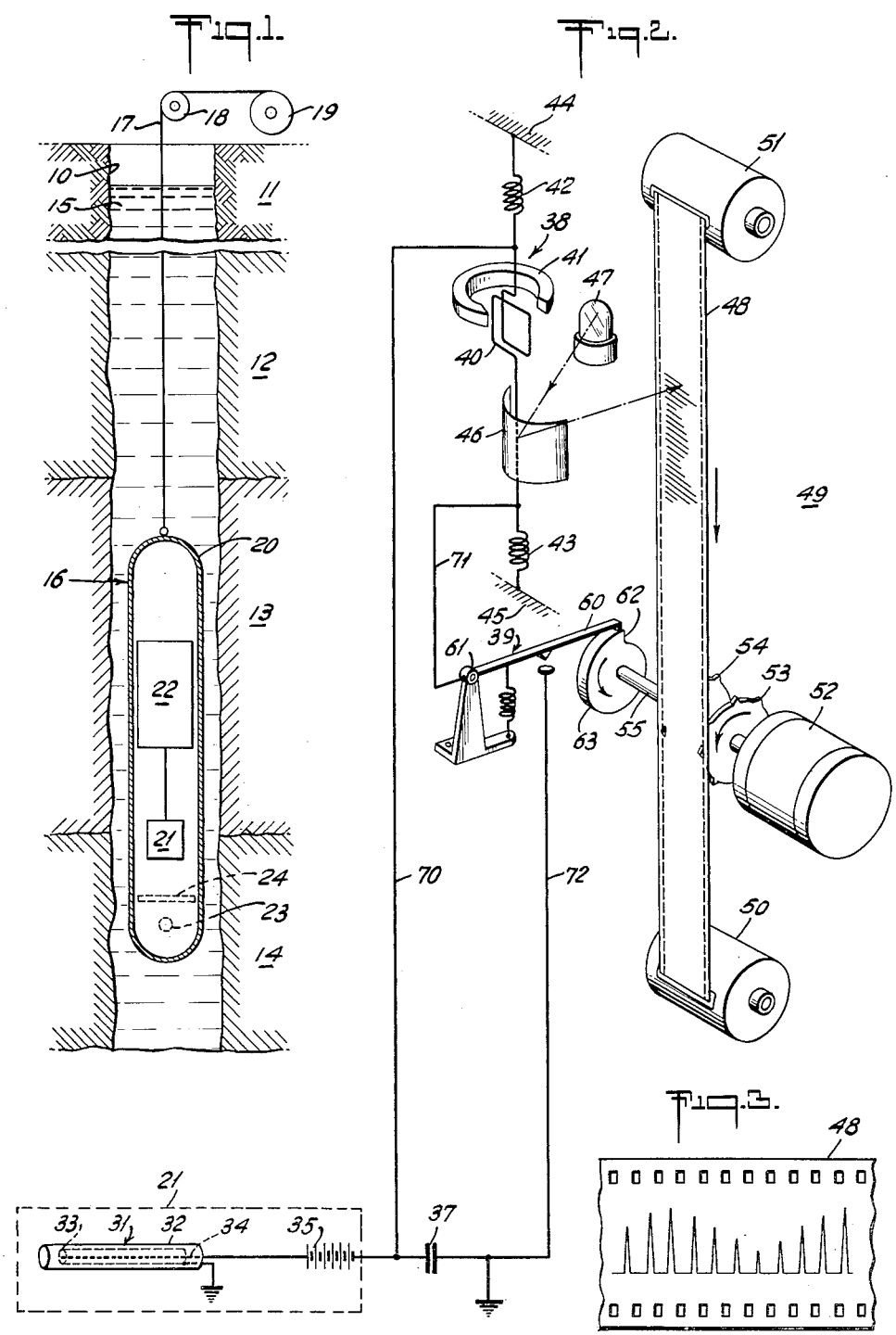

United States Patent Office 3,016,960
Patented Jan. 16, 1962

3,016,960
RADIOACTIVITY GEOPHYSICAL EXPLORATION
Hugh E. Hall, Jr., Bellaire, Tex., assignor to Texaco Inc., a corporation of Delaware
Filed Aug. 13, 1957, Ser. No. 677,967
15 Claims. (Cl. 175—41)

The present invention relates generally to the detection and measurement of penetrative radiation such as gamma rays, neutrons and the like. More particularly, the invention is concerned with the detection of penetrative radiation and recording of the detected radiation on photographic film or the like.

Accordingly, it is a general object of the present invention to provide improvements in the detection and measurement of penetrative radiation.

The invention is of particular utility as applied to the detection and measurement of penetrative radiation in a self-contained well logging instrument.

In order to analyze the earth formations traversed by a bore hole through the surface of the earth, it is well known to employ apparatus suitable for the detection of penetrative radiation in conjunction with cables or the like in order to convey the detector output signal to suitable apparatus at the surface of the earth where it may be displayed by means of a meter or recorded by appropriate means. In certain instances, however, it is desirable to avoid the use of conductors or the like to convey the detector output signal to the surface. Apart from the obvious inconvenience and expense entailed in the use of suitable conductive cables, especially in deep wells, it is often desirable to conduct radioactivity logs of earth formations under conditions where the presence of the cable would impede or prevent other necessary operations. For example, it is often considered desirable to conduct a radioactivity log during the course of the actual drilling of the bore hole. Such a log provides useful information concerning the nature of the earth formations through which the drill is passing without necessitating further interruption of the drilling operation while a separate log is conducted. Moreover, the making of a log during the drilling operation assures that the log is conducted prior to later contamination of the well. A method and apparatus for conducting a gamma-ray log while drilling a bore hole are shown in U.S. Patent No. 2,374,197, granted April 24, 1945 to D. G. C. Hare. In accordance with the Hare patent, the output of the gamma-ray detector is transmitted from a detector within the bore hole to the surface of the earth where it is amplified and recorded. The problem of transmitting the output of the gamma-ray detector to the surface poses a serious problem in the practice of logging while drilling. Thus, it is an object of the invention to provide self-contained means for conducting a radioactivity bore hole log without the need for conductive cables extending from the logging instrument to the surface.

It is a further object of the present invention to provide improved self-contained bore hole logging apparatus for conducting a radioactivity well log involving the detection of penetrative radiation and which may be carried out during the course of drilling the well.

It is a still further object of the present invention to provide improved radioactivity geophysical exploration apparatus involving the recording of a signal on photographic film in response to detected penetrative radiation.

Briefly stated, in accordance with one aspect of the present invention, penetrative radiation is detected and converted to electrical pulses by means of an electrical pulse-producing detector and the electrical pulses are stored in a capacitor during successive detection intervals. Periodically, the capacitor is discharged and the energy stored therein during the preceding detection interval is employed to control the deflection of a reflecting surface for scanning a light beam across a photographic film. The film is transported past the scanning light beam at a predetermined rate in relation to the detection interval.

For additional objects and advantages and for a better understanding of the invention, attention is now directed to the following description and accompanying drawings. The features of the invention that are believed to be novel are particularly pointed out in the appended claims.

In the drawing:

FIGURE 1 is a vertical elevation, partially in cross-section, through a portion of a bore hole showing a well logging instrument suspended therein and which is constructed in accordance with the principles of the invention;

FIGURE 2 is a schematic representation of radiation detection and recording apparatus embodying principles of the invention;

FIGURE 3 illustrates a portion of a typical logging record made in accordance with the invention; and, FIGURE 4 is a vertical elevation, partially in cross-section, through a portion of a bore hole showing a logging-while-drilling instrument embodying principles of the invention.

Figure 4:
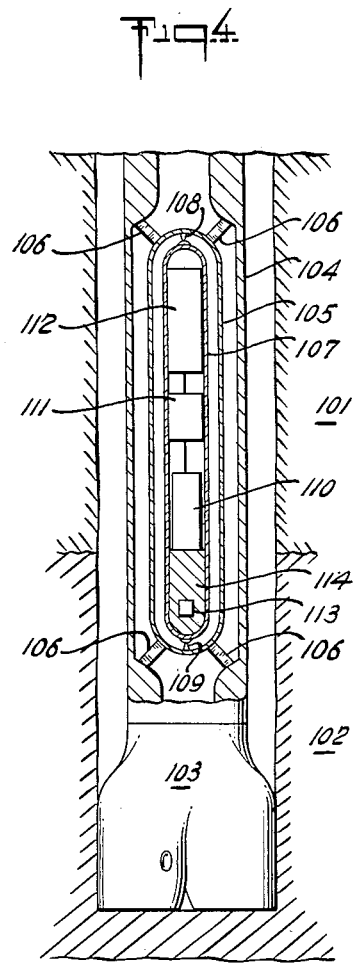

Referring now to FIGURE 1, there is shown a bore hole 10, passing through a series of earth formations 11, 12, 13, 14 and containing the usual bore hole fluid 15 which may comprise drilling mud, oil or water, for example. Within the bore hole 10 there is shown a logging instrument 16 suspended by means of a simple wire line type cable 17. At the surface of the earth there is shown diagrammatically a measuring device 18 in contact with the cable 17 and which is suitable for determining the length of the cable extending into the bore hole at any given time. The end of the cable 17 located at the surface of the earth is affixed to a cable reel 19 which may include appropriate means for reeling the cable and instrument in and out of the bore hole 10. Timing and recording means (not shown) may be located on the surface for correlating the depth of the instrument 16 in the bore hole 10 with time.

The logging instrument 16 comprises a self-contained unit for recording penetrative radiation within the bore hole 10 at various locations throughout its depth. The instrument 16 comprises an outer casing 20 constructed in accordance with known principles to withstand the conditions of pressure and temperature usually encountered in a bore hole. Within the housing 20 there is provided radiation detection and recording means embodying principles of the invention. The last-mentioned means comprises a radiation detector 21 of the pulse-producing type which is preferably a Geiger-Mueller counter. Although, in certain instances the detector may be a scintillation detector, including a phosphor together with appropriate electric circuit means for producing electric pulses in response to scintillations caused by penetrative radiation impinging upon the phosphor, the preferred embodiment comprises a Geiger-Mueller detector which offers advantages such as ruggedness, temperature stability, and internal gas amplification. The detector 21 may be of a type sensitive to gamma rays or it may be one that is sensitive to neutrons, as determined by the type of radioactivity log to be made. The output of the detector 21 is coupled to recording apparatus 22 such as that illustrated in greater detail in FIGURE 2. Within the housing 20, below the detector 21 and spaced therefrom a predetermined distance which, for example, may be of the order of 3 to 20 inches, there may be provided a source of primary radiation 23 and which may comprise a source of gamma or neutron radiation of conventional type as is well known in the art. Intermediate the detector 21 and the source 23 there may be provided a shield 24 for preventing primary radiation produced by the source 23 from passing directly to the detector 21. It is to be understood that the type radiation emitted by the source 23 and the sensitivity of the detector 21, as well as the shielding characteristic of the shield 23, are to be determined in accordance with well-known principles depending upon the type of log to be conducted, as for example, a gamma-gamma log or neutron-gamma log. It is to be understood that in the case of a natural gamma log the source 23 and shield 24 are unnecessary.

Referring now to FIGURE 2, there is shown in greater detail apparatus embodying principles of the invention and which may form the detector 21 and recording components of the logging instrument 16 of FIGURE 1. In FIGURE 2 there is shown an electrical pulse-producing detector 31 corresponding to the detector 21 of FIGURE 1, and which is shown in the form of a Geiger-Mueller detector comprising a sealed housing 32 containing a suitable gas filling and having mounted therein a generally tubular cathode member 33 and a concentric anode member 34. Although the detector 31 is illustrated diagrammatically in simplified form, preferably it should be of the multiple plate cathode type in order to effect greater efficiency. Considered broadly, the detector also includes a unidirectional source of operating potential, shown as a battery 35 connected in series circuit relation across the anode 34 and cathode 33. The cathode 33 is connected directly to common ground. The anode is coupled to the positive side of the source 35. The electrical output signal of the detector 31 appearing between the negative side of the source 35 and common ground, is applied in the form of a current pulse to a charging capacitor 37. This is accomplished by means of a direct connection from the negative side of the source 35 to one electrode of the capacitor 37, the opposite electrode thereof being connected directly to common ground. It will be appreciated that the circuit thus far described provides means for applying a charge to the capacitor 37 in response to the output signal of the detector 31.

Across the electrodes of the capacitor 37 there is provided means for periodically determining and recording the charge applied thereto by the detector during a predetermined time interval, which means is also effective to discharge the charge accumulated on the capacitor in order to clear it for the next detection interval. More particularly, a recording galvanometer 38 and normally-open switch means 39 are connected in series circuit relation across the electrodes of the charging capacitor 37. In particular, a conductor 70 couples the side of the capacitor 37 adjacent the source 35 to one side of the galvanometer 38, another conductor 71 couples the other side of the galvanometer 38 to the switch means 39 and still another conductor 72 couples the other side of the switch means 39 to the side of the capacitor 37 remote from the source 35. Preferably, the galvanometer 38 comprises a string galvanometer including a deflection coil 40 that is suspended between the pole pieces of a permanent magnet 41 by means of a torsion mounting, shown in the form of upper and lower torsion springs 42, 43 appropriately mounted between fixed insulated supporting members 44, 45. A deflection mirror 46 is affixed to the movable deflection coil 40 of the galvanometer 38 for selectively reflecting a beam of light from an adjacent source 47 across the sensitive surface of a strip of photosensitive material or film 48. The film 48 is mounted in a film transport assembly 49 including film takeup and supply spools or reels 50, 51, and means for transporting the strip across the path of the beam reflected by the mirror 46 in a direction generally transverse to the normal direction of the beam by the mirror 46. The light source 47, the mirror 46, and the film 48 are so positioned in relation to one another that the actuation of the galvanometer 38 by means of an electric current causes the light beam to scan across the surface of the film 48 in a direction transverse to the direction of transport of the film. The distance travelled across the film by the scanning light beam is proportional to the current applied to the deflection coil 40 of the galvanometer 38. It is to be understood that appropriate means are provided for shielding the light source in order that only those light rays reflected by the mirror to form the scanning beam impinge upon the film. Preferably, the film takeup and supply reels 50, 51 should be in the form of light-tight cartridges in order to faciliate handling of the film before and after a logging operation.

The film transport means 49 includes an appropriate motor device 52 which preferably is in the form of an electric motor, as shown, powered by means of a battery or other stable source. It is noted, however, that the motor device 52 may, in certain instances, be of the spring-wind clock-work type. In any event, the motor device should have appropriate speed governing and controlling characteristics in order to enable the rate of the film transport to be controlled and measured in accordance with a predetermined time schedule. Advantageously, the film strip is provided with a series of equally spaced perforations or notches along one or both edges thereof, as is conventional, for example in the case of 35 millimeter movie film, in order to facilitate transport of the film by means of a sprocket drive. This may be accomplished by the provision of a pair of sprocket wheels 53, 54 secured to the shaft 55 of the motor device 52 in order to assure positive film transport at a given speed.

Preferably, the switch means 39 which comprises a normally-open switch that may be closed for a brief time at the end of successive detection intervals, should be coupled to the film transport means 49 in such manner that the film 48 is transported a predetermined discrete distance during a predetermined time interval between the successive closures of the normally open switch contacts. As shown in FIGURE 2, the switch may comprise an arm member 60 having one end mounted in pivotal relation to a fixed reference, as at 61, and having an insulating projecting rider 62 at its opposite end which rides against a camming member 63 that is affixed to the shaft of the motor device that drives the film transport sprocket. A moveable contact member is affixed to the arm member and a fixed contact member is positioned opposite the moveable one. The surface of the camming device that contacts the rider describes a spiral extending outwardly from its axis of rotation. The direction of rotation of the spiral is such that the moveable contact carried by the switch arm is caused to pivot progressively away from the fixed contact as the camming member rotates until the contacting position is reached at which point the rider suddenly drops to the lowest position on the camming member whereby the moveable contact carried by the switch arm is caused to contact the fixed contact member in order to close the normally-open switch. Biasing means, shown as a tension spring is provided for continuously urging the rider of the switch arm against the camming surface of the camming member in order to assure positive and abrupt switch closure.

The above-described switch provides means whereby the switch contacts are moved further apart during the detection interval as a charge accumulates on the capacitor. At the end of the detection interval, when the switch contacts are spaced furthest apart, the contacts are suddenly brought together in such manner as to provide positive action without danger of arcing.

Figure 2A:
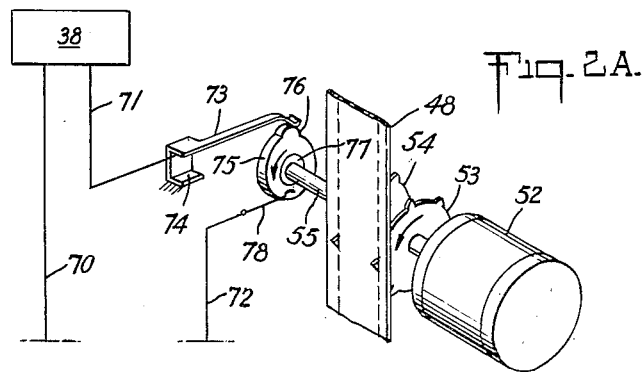
FIGURE 2A is a schematic representation of a portion of a modified form of the apparatus shown in FIGURE 2.

Another form of switch means which may be employed in carrying out the invention may comprise a rotating contact arm affixed to the shaft of the film transport motor and which is adapted and arranged to contact a fixed contact member during a brief portion of its rotary cycle in order to discharge the capacitor. Switch apparatus of this type is illustrated in FIGURE 2A wherein the elements corresponding to those of FIGURE 2 are identified with the same reference numerals. In FIGURE 2A the conductor 71 leading from the galvanometer 38 is shown connected to a fixed contact arm 73 having a base portion 74 mounted to a fixed mechanical reference. The free end of the member 73 is positioned opposite a rotatable contact member 75 illustrated in the form of a wheel having a raised contact portion 76 for selectively contacting the extended end of member 73 during a brief portion of each rotary cycle. The rotatable contact member 75 is mounted to the shaft 35 of the motor device 55 which is employed to transport the film 48 as shown in FIGURE 2 and described above. An insulating bushing 77 electrically isolates the rotatable contact 76 from the motor shaft 55. Continuous electrical contact is made with the rotating portion of the contact member 75 by means of a wiper arm 78, which, in turn, is connected to the conductor 72. Although not specifically shown in FIGURE 2A, it is to be understood that the free end of the contactors 70 and 72 are connected across the capacitor 37 to the detector 21, as shown in FIGURE 2.

As illustrated in FIGURE 3, the log produced on the photosensitive strip by the above apparatus comprises a series of spaced spikes with dense spots on the peaks along the film strip. Each of the spikes represents the cumulative penetrative radiation detected during the immediately preceding detection interval. The amplitude of the various spikes represents the amount of the accumulated radiation. More specifically, the amplitude of each spike is proportional to the integrated value of the pulses produced by the detector during the immediately preceding detection interval. If the detector output pulses are of constant amplitude as in the case of a Geiger counter, for example, the amplitude of the signal spike produced on the film is proportional to the number of counts produced by the detector during the detection interval. If, on the other hand, the amplitude of the detector output pulses is proportional to the energy of the detected radiation, as in the case of a proportional counter, the amplitude of the signal spike produced on the film is proportional to the total energy of the radiation detected during the detection interval. The distance between the successive spikes represents the duration of the detection interval. The form of the various spikes, i.e., slightly rounded spikes, is due to the fact that the galvanometer moves rapidly during the initial charge of the capacitor but momentarily stops before reversing its direction in returning to the zero position. This reversing point produces a series of emphatic points which show up clearly on the film and which make up the log.

During the course of logging a well, the radiation detection apparatus in accordance with the invention may be set in continuous operation such that the film is transported past the galvanometer scanning beam at a predetermined rate and the detection-discharge cycle proceeds at a given rate, in order to provide a record of detected radiation with time. During the course of logging, a record is also made at the surface of the earth showing the position of the logging instrument in the bore hole with time. After the log has been run and the film strip has been processed, the logging time record showing the position of the logging instrument is correlated with the record of the detected radiation in order to determine the location in the bore hole of the detected radiation during corresponding time intervals. In the case of a logging-while-drilling operation a similar procedure may be employed and the position of the logging instrument in the bore hole may be determined by reference to a record made at the surface showing the depth of the drill bit with time. Apparatus for carrying out such a log is illustrated in FIGURE 4.

In FIGURE 4, there is shown successive earth formations 101, 102 penetrated by a drill bit 103 attached to the lower end of a drill string 104. Within the drill string 104, in the vicinity of the drill bit, there is positioned a logging-while-drilling housing or capsule 105 which contains instrumentation generally like that of the logging instrument 16 shown in FIGURE 1. The capsule 105 is mounted within a section of the drill string 104 in spaced relation from the inner surface thereof, as by means of appropriate mounting studs 106, in such manner that drilling fluid is free to pass downwardly through the drill string, around the capsule 105 and on to the drill bit 103 where it may perform its usual functions in connection with operation of the drill. Preferably the logging capsule 105 is mounted as close to the drill bit 103 as practical considerations permit in order to assure that the logging apparatus is employed to observe and analyze the earth formations as closely as possible to the bottom of the hole and further to assure that the log is conducted as soon as possible after the drill cuts through the formations and prior to possible invasion and/or contamination of the formations by the drilling fluid. Advantageously, therefore, the capsule 105 may be mounted within a section of drill pipe located between the drill bit and the usual drill collar (not shown).

The capsule 105 is of relatively rugged construction in order that it may withstand the pressures and temperatures found in the region of the drill bit during the drilling operation. The capsule 105 is of fluid-tight construction in order to prevent seepage of fluids to the interior thereof, which contains the actual logging instruments. The logging instruments are mounted within an inner housing or capsule 107 that is mounted in such manner that it is free to rotate on its vertical axis independently of the rotary motion of the drill bit. This is preferably accomplished by mounting the inner capsule 107 to the outer capsule 105 by means of upper and lower thrust bearings 108, 109 in the form of ball bearing assemblies. The instrumentation contained within the inner housing 107 corresponds to that shown in FIGURE 2 of the drawing. This instrumentation includes a radiation detector 110 which corresponds to the detector 31 shown in FIGURE 2. Above the detector 110 there is positioned a condenser and high voltage power supply 111 corresponding to the condenser 37 and the high voltage power supply 35 of FIGURE 2. Above the condenser-power supply unit 111, there is shown diagrammatically a recording apparatus 112 which, likewise, corresponds to the recording apparatus including the galvanometer, switch, and film transport means shown in FIGURE 2. Below the detector 110 there is shown a radiation source 113 mounted in appropriate shielding means 114. The source 113 may be like that shown and described with respect to FIGURE 1. The specific nature of the shield 114 depends upon the characteristics of the source and the detector employed in the logging operation. The shield 114 may be formed of lead, for example, in the event that it is desirable to prevent gamma rays from passing directly from the source 113 to the detector 110.

A radioactivity well log conducted in accordance with the present invention provides useful information concerning characteristics of the earth formations traversed by the well bore, which information is useful in determining whether or not certain other operations are to be performed in the bore hole and, if so, at which locations such operations should be performed. For example, this information may be useful in determining whether a well casing should be placed, whether cement should be placed behind the casing, and whether the casing should be perforated for the production of oil. It is important, therefore, that the exact location in the well bore at which a radioactivity logging measurement is made should be accurately determined. In order to assure correlation between the radioactivity well log and a subsequent operation in the well bore, a depth measuring apparatus may be employed to locate the position of the logging instrument in the well bore. In the case of a log conducted with apparatus associated with the drilling apparatus, as shown in FIGURE 4 for example, a known type of apparatus may be employed to locate the position of the logging apparatus in the well bore. By way of example, apparatus may be employed for continuously recording the depth of the drill bit in the bore hole in correlation wtih time, such as the well-known apparatus involving mechanism for continuously recording a graph of the movements of the drill string in the well by recording movements of the travelling block which is attached to the drill string at the surface during the drilling operation in order to provide means for raising or lowering the drill string in the well bore. Such apparatus is marketed commercially by the Warren Automatic Tool Company under the name of "Rig-Runner." It is further contemplated that the well log may be correlated with a latter operation in the well through the use of a marker, such as a radioactive bullet that is shot into the formation when the log is conducted and which serves as a reference point in the well and which may be later located by means of a detector in order to correlate the latter operation with the well log. Method and apparatus involving the use of a radioactive bullet as a marker in bore hole operations is disclosed for example in U.S. Letters Patent No. 2,592,434, issued April 8, 1952 to Shelley Krasnow. This is particularly important in the case of a log conducted in a deep well, which may be of the order of two to four miles in depth, and wherein the logging cable, or the drill string in the case of logging-while-drilling operation may vary appreciably in length due to its own weight and due to variations in temperature.

Suitable apparatus for mounting the self-contained radiation detection unit of the present invention in the vicinity of a drill bit, as illustrated in FIGURE 4, for conducting a log while drilling a bore hole is shown in the co-pending application of R. J. Clements, B. D. Lee, R. B. Stelzer, Serial No. 677,969 entitled Geophysical Prospecting Apparatus, filed concurrently with this application on August 13, 1957.

Obviously, many modifications and variations of the invention, as hereinbefore set forth, may be made without departing from the spirit and scope thereof, and therefore only such limitations should be imposed as are indicated in the appended claims.

I claim:

1. A self-contained instrument for logging the earth formation traversed by a well bore, said instrument containing an electrical pulse producing type radiation detector, a capacitor electrically coupled across the output of said detector, means for periodically discharging the accumulated electrical charge stored on said capacitor during a detection time interval of predetermined duration comprising a string galvanometer and normally open switch means connected in series circuit relation across the electrodes of said capacitor, a photosensitive strip, means for transporting the photosensitive strip past the string galvanometer at a predetermined rate, a light source, means synchronized with the film transport means for selectively closing the contacts of said switch at predetermined spaced time intervals and means including said string galvanometer for selectively scanning a light beam produced by said source across the photosensitive strip in a direction generally traverse to the direction that the strip is transported.

2. Apparatus for conducting a radioactivity well log during the course of drilling the well which comprises a self-contained well logging instrument as defined in claim 1, further characterized in that it is mounted within a drilling string in the vicinity of a drill bit.

3. The method of detecting and recording penetrative radiation which comprises the steps of causing said radiation to impinge upon an electrical pulse producing type detector in order to produce electrical pulses corresponding to detected radiation, storing the pulses occurring during a detection time interval of predetermined duration in an electrical capacitor, periodically discharging the capacitor at the end of each detection interval, causing the capacitor discharge to control the deflection of a reflecting surface in order to scan a light beam across the sensitive surface of a photosensitive strip, transporting the photosensitive strip past the scanning light beam at a predetermined rate in relation to the detection interval.

4. The method of claim 3 wherein the amplitude of the electrical pulses produced by the detector is substantially constant, whereby the accumulated charged on the capacitor corresponds to the number of pulses occurring during a given detection interval.

5. The method of claim 3 wherein the amplitude of the electrical pulses produced by the detector is proportional to the energy of the detected radiation, whereby the charge accumulated on the condenser during each detection interval is proportional to the integrated dosage of the penetrative radiation occurring during the detection interval.

6. The method of logging a bore hole to provide a record of a characteristic of the earth formations traversed by the bore hole which comprises passing an instrument containing an electrical pulse producing type detector through the bore hole in order to cause said detector to intercept radiation within the bore hole and to produce electrical pulses corresponding to the detected radiation, storing the pulses occurring during a detection time interval of predetermined duration in an electrical capacitor, periodically discharging the capacitor at the end of each detection interval, causing the capacitor discharge to control the deflection of a reflecting surface in order to scan a light beam across the sensitive surface of a photosensitive strip, transporting the photosensitive strip past the scanning light beam at a predetermined rate in relation to the detection interval.

7. The method of logging a bore hole during the course of drilling the hole to provide a record of a characteristic of the earth formations traversed by the bore hole which comprises the steps of mounting a self-contained logging instrument containing an electrical pulse producing type radiation detector within and in spaced relation to a drill string above the drill bit and in the vicinity thereof, circulating drilling fluid downwardly through the drill string and through the space between the logging instrument and the wall of the drill string to the drill bit while rotating the drill string to actuate the drill bit, producing electrical pulses corresponding to detected radiation impinging upon said detector, storing the pulses occurring during a detection time interval of predetermined duration in an electrical capacitor, periodically discharging the capacitor at the end of each detection interval, causing the capacitor discharge to control the deflection of a reflecting surface in order to scan a light beam across the sensitive surface of a photosensitive strip, transporting the photosensitive strip past the scanning light beam at a predetermined rate in relation to the detection interval.

8. Apparatus for logging an earth formation traversed by a well bore during the course of drilling a well comprising a sealed housing mounted within a tubular member comprising a portion of a drill string, said housing being spaced from the said conduit in order to provide a passageway for drilling fluid passing through the drill string to the drill bit, a self-contained logging instrument within said housing, said instrument being mounted for rotation about its vertical axis, said instrument including an electrical pulse-producing type radiation detector, a capacitor electrically coupled across the output of said detector, means for periodically discharging the accumulated electrical charge stored on said capacitor during a predetermined detection interval comprising a string galvanometer and normally open switch means connected in series circuit relation across the electrodes of said capacitor, a photosensitive strip, means for transporting the photosensitive strip past the string galvanometer at a predetermined rate, a light source, means synchronized with the film transport means for selectively closing the contacts of said switch at predetermined spaced time intervals and means including said string galvanometer for selectively scanning a light beam produced by said source across the photosensitive strip in a direction generally traverse to the direction that the strip is transported.

9. Apparatus for logging an earth formation traversed by a well bore during the course of drilling a well comprising a sealed housing mounted within a tubular member comprising a portion of a drill string, said housing being spaced from said member in order to provide a passageway for drilling fluid passing through the drill string to the drill bit, a self-contained logging instrument within said housing, said instrument being mounted for rotation about its vertical axis, said instrument including an electrical pulse producing type radiation detector, means for converting the output of said detector to photon radiation, means for selectively fogging a strip of photosensitive material in response to photons emitted in response to the output of said detector.

10. Apparatus for logging an earth formation traversed by a well bore during the course of drilling a well comprising a sealed housing mounted within a tubular member comprising a portion of a drill string, said housing being spaced from said member in order to provide a passageway for drilling fluid passing through the drill string to the drill bit, a self-contained logging instrument within said housing, said instrument being mounted for rotation about its vertical axis, said instrument including a radiation detector and means for producing a record in response to the output of said detector.

11. Apparatus for logging an earth formation traversed by a well bore during the course of drilling a well comprising a sealed housing mounted within a tubular member comprising a portion of a drill string, said housing being spaced from said member in order to provide a passageway for drilling fluid passing through the drill string to the drill bit, a self-contained logging instrument within said housing, said instrument being mounted for rotation about its vertical axis, said instrument including means for detecting penetrative radiation from the earth formation in the vicinity of the drill bit as the well is drilled.

12. Apparatus for logging an earth formation traversed by a well bore during the course of drilling a well comprising a sealed housing mounted within a tubular member comprising a portion of a drill string, a self-contained logging instrument within said housing, said instrument being mounted for free rotation about its vertical axis, said instrument including a radiation detector and means for producing a record in response to the output of said detector.

13. In a system for conducting a radioactivity well log of the earth formations traversed by a bore hole during the course of the actual drilling of the bore hole, said system including a radiation detector mounted in the vicinity of a drill bit whereby it is responsive to radiation emitted by earth formations in the bore hole in the vicinity of the drill bit as the bore hole is actually drilled and means for recording a signal output of the detector correlated with the position of the detector in the bore hole, the improvement wherein the radiation detector of said system is included in a logging instrument contained in a sealed housing, said housing being mounted within a tubular member comprising a portion of the drill string above the drill bit, said housing being spaced from said member to provide a passageway for drilling fluid passing through the drill string to the drill bit, said instrument being mounted within said housing for free rotation about the vertical axis of the drill string, whereby rotational movement of the drill string during the drilling operation is effectively isolated from the logging instrument.

14. In a system for conducting a radioactivity well log of the earth formations traversed by a bore hole during the course of the actual drilling of the bore hole, said system including a radiation detector mounted in the vicinity of a drill bit whereby it is responsive to radiation emitted by earth formations in the bore hole in the vicinity of the drill bit as the bore hole is actually drilled and means for recording a signal output of the detector correlated with the position of the detector in the bore hole, the improvement wherein the radiation detector of said system is included in a logging instrument mounted for free rotation about the vertical axis of the drill string, whereby rotational movement of the drill string during the drilling operation is effectively isolated from the logging instrument.

15. A system as defined in claim 13 wherein the radiation detector is of the multiple plate cathode Geiger-Mueller type.

References Cited in the file of this patent

UNITED STATES PATENTS

| | | |
|---|---|---|
| 2,349,366 | Moon | May 23, 1944 |
| 2,480,674 | Russell | Aug. 30, 1949 |
| 2,490,674 | Christ et al. | Dec. 6, 1949 |
| 2,524,031 | Arps et al. | Oct. 3, 1950 |
| 2,842,675 | Scherbatskoy | July 8, 1959 |

UNITED STATES PATENT OFFICE

CERTIFICATE OF CORRECTION

Patent No. 3,016,960 January 16, 1962

Hugh E. Hall, Jr.

It is hereby certified that error appears in the above numbered patent requiring correction and that the said Letters Patent should read as corrected below.

Column 3, line 71, after "the", third occurrence, insert -- light --; line 73, after "direction" insert -- of deflection --.

Signed and sealed this 8th day of May 1962.

(SEAL)
Attest:

ERNEST W. SWIDER
Attesting Officer

DAVID L. LADD
Commissioner of Patents